April 22, 1952  E. DAWSON  2,593,416
AUTOMATIC REVERSING MECHANISM
Filed July 7, 1949  3 Sheets-Sheet 1
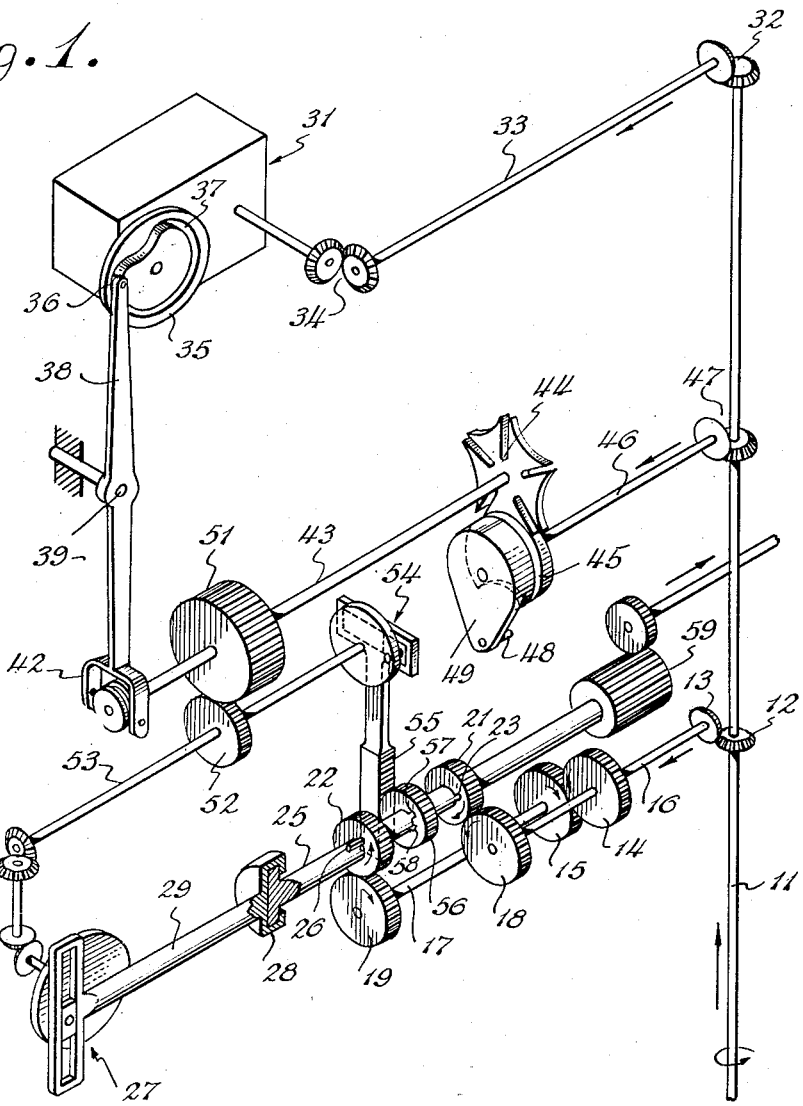
Fig.1.
Fig.2.
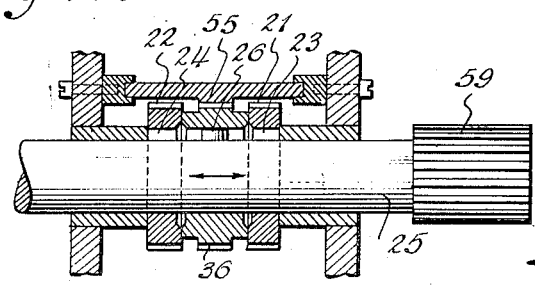
INVENTOR
EDWARD DAWSON
BY
H. N. Thompson
his ATTORNEY.

April 22, 1952 E. DAWSON 2,593,416
AUTOMATIC REVERSING MECHANISM
Filed July 7, 1949 3 Sheets-Sheet 3

INVENTOR
EDWARD DAWSON
BY
his ATTORNEY

Patented Apr. 22, 1952

2,593,416

UNITED STATES PATENT OFFICE 2,593,416

AUTOMATIC REVERSING MECHANISM

Edward Dawson, New York, N. Y., assignor to The Sperry Corporation, a corporation of Delaware Application July 7, 1949, Serial No. 103,465

11 Claims. (Cl. 74—339)

1

This invention relates to automatic reversing mechanisms and particularly concerns a mechanism wherein the reversal may be smoothly effected without loss of synchronism between the input and output shafts.

Various methods are known to the art for reversing the relative direction of rotation of two shafts. In many of these devices the reversal is effected manually, while in others it may be made to occur automatically on completion of a predetermined number of revolutions of an input shaft, or else it may be made to occur at specified time intervals. Reversing mechanisms are often used in automatic machinery when the cycles of operation are based upon periodic reversals of a drive shaft. Reversing mechanisms are also used in such instruments as cam mechanisms for determining the values of periodic functions, in scanning devices, and in many other technical applications.

An elementary form of reversing mechanism that is extensively used, because of its simplicity, is that in which reversal is accomplished by shifting a jaw clutch from engagement with one drive shaft to engagement with another drive shaft that is geared to rotate in the opposite direction. However, this sort of mechanism has inherent disadvantages which make it unsuitable for many applications. A principal disadvantage is that the reversal is abrupt and is accomplished by impact with consequent noise and risk of damage to the mechanism. A second disadvantage is that indefinite amounts of relative rotation between the input and the output shafts may occur during reversals and this defect becomes particularly pronounced when the load transmitted is large. In the past, attempts have been made to minimize the effect of impact and to obtain a gradual reversal, by the use of a friction clutch or hydraulic coupling. While these modifications tend to reduce shock, they do not prevent the loss of synchronism between the input and output shafts.

The mangle wheel is one of the few mechanisms known to the art that is capable of effecting a gradual reversal while maintaining synchronism between the input and output shafts, but the limited amplitude of output motion that can be obtained with it renders it unsuitable for many purposes.

Therefore, a primary feature of the present invention is the provision of a reversing mechanism wherein the output shaft is made to stop and start gradually during reversal.

Another feature is the provision, in a reversing mechanism, of means for maintaining synchronism of the input and output shafts throughout the reversing cycle, although the output shaft may go through unlimited rotations between reversals. A further feature is provided in that uniform velocity drive from input to output shafts between periods of reversal is accomplished through a minimum number of gear meshes.

A further feature is in the provision of a reversing mechanism that is suitable for mechanical, electrical, hydraulic, or pneumatic initiation of the reversing cycle, with either automatic or manual control.

A still further feature is in the reversibility of the rotation of the input shaft at any time without loss of synchronism. These and other features will become more readily discernible from the specification, taken in connection with the accompanying drawings in which:

Fig. 1 illustrates, in schematic form, a reversing mechanism in accordance with a preferred embodiment of the invention;

Fig. 2 is a cross section of a detail of Fig. 1 including the drive shaft and the contra-rotating drive gears;

Figure 3:
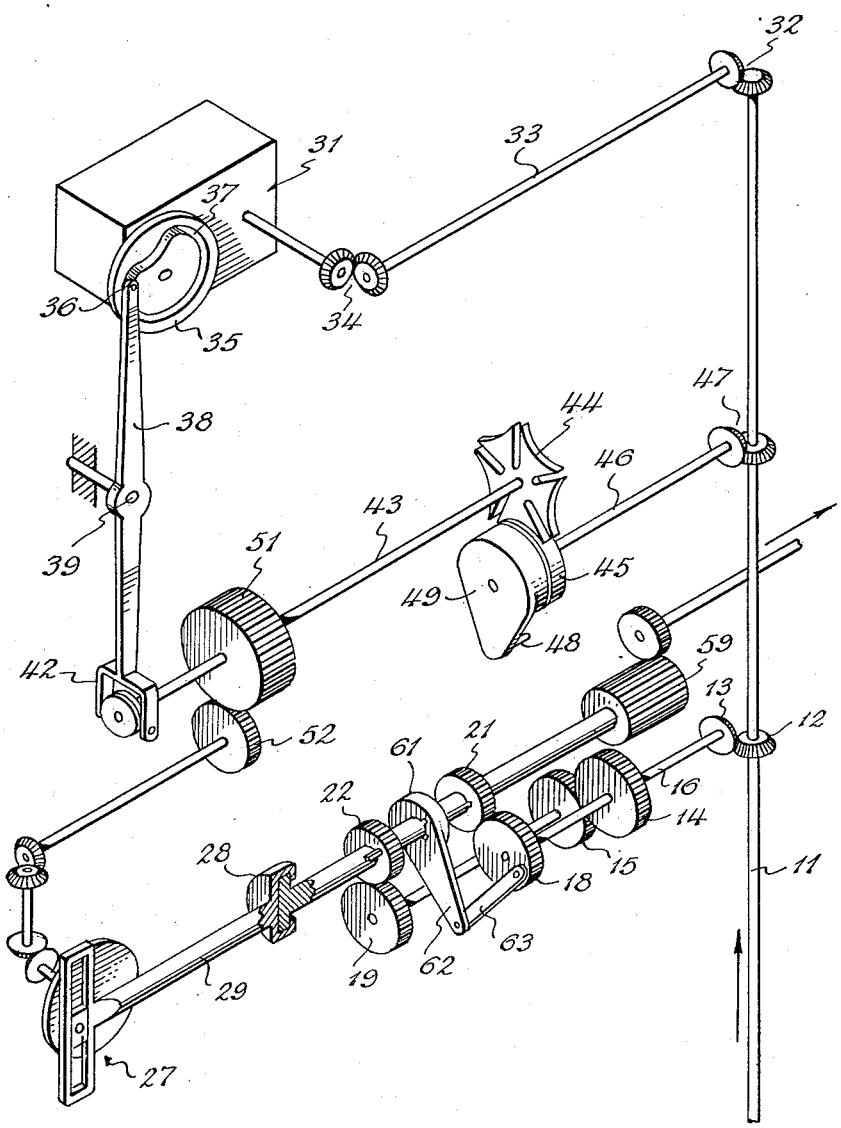
Fig. 3 is a schematic form of an alternative embodiment of the present invention.

Referring now to Fig. 1 rotary motion may be imparted to the input shaft 11 and this motion is transmitted through the meshing pinions 12 and 13 to contra-rotating gears 14 and 15, gear 14 being mounted with pinion 13 on shaft 16, and gear 15 being mounted on a separate shaft 17. Gears 14 and 15 are arranged to lie in a common plane and are arranged to mesh. Also provided on shafts 16 and 17 respectively are contra-rotating pinions 18 and 19 arranged to lie in separate planes. Gears 18 and 19 mesh with coaxial pinions 21 and 22 respectively, and cause these pinions to rotate in opposite directions. Each of pinions 21 and 22 is provided with a key-way, the pinion 21 having key-way 23 and pinion 22 having a key-way 24. The key-ways are better viewed from Fig. 2 of the drawing which also shows the shaft 25 and its key 26 which, in Fig. 1, is illustrated as engaging the shaft 25 to the pinion 22.

The key-ways 23 and 24 serve to permit the key 26 to engage either the pinion 21, or the pinion 22 and thus drive output shaft 25 between periods of reversal. The key 26 is an integral part of shaft 25 and is positionable axially upon the axial displacement of shaft 25. Shaft 25 is arranged to be axially positionable by means of a scotch yoke generally identified as 27. A thrust bearing 28 secures the rotatable shaft 25 so as to be axially displaceable by action of scotch yoke 27, although the shaft 29, interconnecting the scotch yoke 27 with the thrust bearing 28, is prevented from rotation. The amount of axial displacement of the drive shaft 25 is determined by the action of the scotch yoke 27, and the key 26 will either engage the driving pinion 22, thereby causing the shaft 25 to rotate in one direction, or upon axial displacement of the drive shaft 25 through action of the scotch yoke 27, the key 26 may thereupon be made to engage the pinion 21 and thus drive the output shaft 25 in the opposite direction.

In the present embodiment the reversing cycle is illustrated as being initiated by a timing mechanism 31, which is driven by, and hence responsive to, the rotation of the input shaft 11. The input rotation is imparted to the timing mechanism 31 through the meshing pinions 32, shaft 33 and pinions 34. After a predetermined number of input revolutions, the number of revolutions being preset in the timing mechanism 31, the cam 35 is caused to rotate, causing the cam follower 36 to follow the contour of the track 37 of the cam 35. The cam follower 36 is mounted on a rocker arm 38 pivoted at point 39. Therefore, when the cam follower 36 is caused to move, the yoke 42 at the lower end of the rocker arm 38 will be moved to the left and shaft 43 secured to the yoke 42 will also be axially positioned to the left, as illustrated in Fig. 1. On the opposite end of shaft 43 from the yoke 42, is a Geneva cam 44 which is normally idle and rests upon the non-rotating cylindrical surface of the housing, 45, which acts as a detent. Upon angular displacement of the shaft 43 leftward, pin 48 of Geneva drive member 49 which is rotated by the shaft 46 is caused to enter one of the slots on the Geneva cam and accordingly rotationally displaces the Geneva cam and the shaft 43 from their position of rest to a position advanced by an amount dependent upon the number of slots in the Geneva cam 44. As the shaft 43 is rotated, an elongated gear 51 mounted on that shaft and meshing with gear 52, imparts rotation to the gear 52 and its mounting shaft 53. Rotation of shaft 53 causes two crank mechanisms or scotch yokes 27 and 54 to be driven, each through one half of a revolution. As explained earlier, crank mechanism or scotch yoke 27 shifts drive shaft 25 axially so that key 26 passes from engagement with drive pinion 22 to drive pinion 21, or vice versa. However, during the translation of shaft 25, scotch yoke 54 also rotates through one half of a revolution and acts, through rack 55, to cause pinion 56, also mounted on drive shaft 25 and designated as the reversing pinion, to accelerate from rest, reach a maximum speed in one direction, slow down and stop, then accelerate to a maximum speed in the other direction and finally come to rest at its original angular position. When the key 26 passes from engagement with pinion 22 to pinion 21, the speed of reversing pinion 56 is first arranged to increase until it equals that of drive pinion 22. It is at this time, that the key 26 is sliding from the key-way of pinion 22 into one of the key-ways of reversing pinion 56. Then, reversing pinion 56 comes to rest, halting rotation of the drive shaft 25. Next, reversing pinion 56 accelerates in the opposite direction until it matches the speed of pinion 21 when key 26 slides from reversing pinion 56 into the key-way of pinion 21, and finally reversing pinion 56 is brought to a gradual stop at its original position. When the key 26 slides from engagement with pinion 21 to pinion 22, the preceding sequence is reversed with the exception that the key 26 passes through a different key-way in reversing pinion 56. The two key-ways in pinion 56 are indicated at 57 and 58 and the angle between them may be calculated mathematically. At the end of the reversing cycle, the cam follower 36 is moved away from the axis of rotation of cam 35 so that Geneva cam 44 is returned to its detent on fixed cylindrical surface 45 and unidirectional drive from the input shaft 11 to the output shaft 25 is maintained through drive pinion 21 or 22 until the beginning of the next reversal. The output gear is shown at 59 as an elongated gear to permit translation of the shaft 25.

An alternative embodiment of the instant invention is shown in Fig. 3 and, as many of the elements of the embodiment to be described are similar to those already described, they bear like numbers to those they bore in Fig. 1. The scotch yoke 54 of Fig. 1 together with rack 55 which served to supply the reversing pinion 56 with a reciprocating motion during the reversing cycle, have been replaced by a disc (or hub) 61 having a crank arm 62 secured to a link 63 which is attached to the input gear 18 at a point displaced from its center. This arrangement imparts to the disc 61 an oscillating motion at all times that shaft 11 rotates. The disc 61 and its associated mechanism serve the same function, during the reversing cycle, that the scotch yoke 54 and rack 55 served in the embodiment illustrated in Fig. 1. An important difference in the operation of the two embodiments is that in the second embodiment the disc 61 is in constant oscillation, whenever an input rotation is imparted to shaft 11, and this motion is substituted for the motion that was supplied by the scotch yoke 54 and rack 55 of Fig. 1. An advantage presented by the apparatus shown in Fig. 3 is that a more direct drive from the input is provided for the reversing components.

Figure 4:
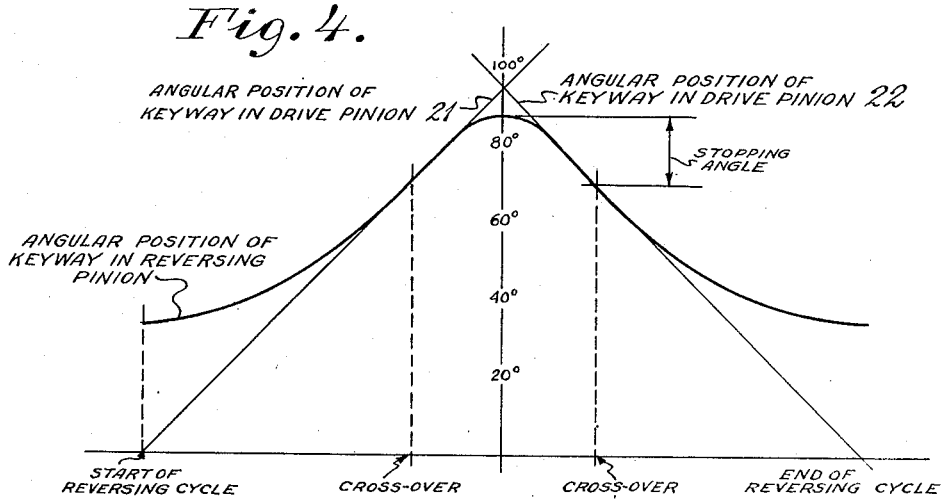
Fig. 4 illustrates graphically the time-position sequence of the contra-rotating drive gears during a reversing cycle.

The graph of Fig. 4 illustrates the reversing cycle with particular reference to the position of the key-way as the reversing cycle progresses. From the graph it can be seen that at the start of the reversing cycle, the angular position of the key-way in the reversing pinion is approximately 36° displaced from the angular position of the key-way in one of the drive pinions. However, as the reversing pinion is brought up to speed, the angular positions very nearly coincide over a range of approximately 10° and it is in this range that the key enters the reversing pinion.

Similarly, the transfer of the key from the reversing pinion to the oppositely rotating pinion is accomplished when the angular positions of the reversing pinion and the second pinion are in agreement.

Figure 5:
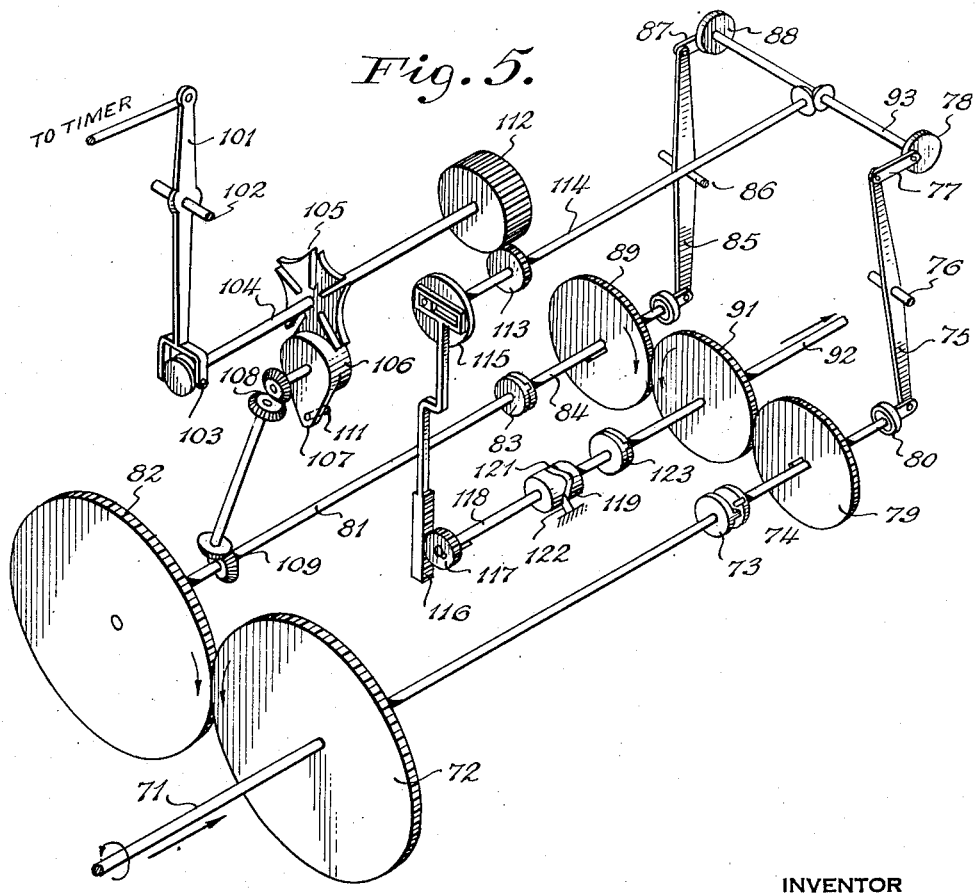
Fig. 5 is a schematic illustration of a second alternative embodiment of the present invention.

A second alternative embodiment of the instant invention is illustrated in Fig. 5 wherein an input shaft 71 is provided with a gear 72, and a coupling device 73 that may, upon proper actuation, interconnect the input shaft 71 to a shaft 74 which is axially translatable by means of the rocker arm 75 pinned at one end thereof and acting through thrust bearing 80. Rocker arm 75 is pivotable about the rod 76 and rocking motion may be imparted to the rocker arm 75 by the connecting rod 77 which in turn is secured in an offset manner to the wheel 78. When the wheel 78 is made to rotate by elements to be hereinafter described, the rocker arm 75 will cause the shaft 74 to move toward the coupling 73 thereby engaging the input shaft 71 to the shaft 74 and causing the driving pinion 79 mounted thereon to rotate in accordance with the input. Arranged on shaft 81 for contra-rotation relative to the input shaft is a gear member 82 meshing with gear 72. The shaft 81 is also provided with a coupling device 83 which may secure the shaft 81 to cause the shaft 84 to rotate, when the rocker arm 85 causes the shaft 84 to be positioned axially into engagement with the coupling 83. The rocker arm 85, in turn, is mounted on the rod 86 and is secured by means of the arm 87 to the activating wheel 88. The arm 87 is pinned to the wheel 88 in an offset manner to provide upon rotation, an oscillating motion to the rocker arm 85. A second drive pinion 89 is mounted on the shaft 84 and rotates in opposite direction to the drive pinion 79. In between the two driving pinions 79 and 89 is a reversing pinion 91 which is mounted for rotation on the drive shaft 92 and meshes with each of the drive pinions 79 and 89. Inasmuch as the wheels 88 and 78 with offset pins are mounted on a common shaft 93, by arranging the arm 77 and 87 to be "out of phase" the shaft 84 may be made to be in a coupled relation with shaft 81 while the shaft 74 will be in a disengaged relation to the shaft 71. In the positions shown in the drawing, the reversing pinion 91 is being driven by the drive pinion 89 through the shaft 84, coupling 83, shaft 81, contra-rotating gears 82 and 72, and input shaft 71. By rotating the shaft 93, the coupling 83 will disengage shaft 84 from shaft 81 and at the same time shaft 74 will become engaged through the coupling 73, to be driven by the shaft 71, and the drive pinion 79 will thereupon serve to drive the reversing pinion 91 and hence, output shaft 92, in the opposite direction.

In order to effect the aforementioned reversal, a rocker arm 101 is provided to be actuated by a timing mechanism which in this instance is shown disassociated from the input. The timing mechanism may be actuated manually, or in any other desired manner. Upon displacement of the top of the rocker arm, to the left in the Fig. 5, it will rotate about the axis 102 and will displace the yoke 103 to the right in the drawing. Secured to the yoke 103 for both axial translation and free rotation is a shaft 104 on which is mounted a Geneva cam 105 which normally rests on the circumference of the wheel 106 which is rotating underneath it. The wheel 106 and the Geneva drive member 107 are connected to the input shaft 71 through the bevelled gears 108 and 109, the latter gear being mounted on the shaft 81 which is continually rotated from the input shaft 71. Upon displacement of the shaft 104 to the left in the drawing, the pin 111 of the Geneva drive member will engage one of the slots of the Geneva 105 and cause the shaft 104 to rotate an amount dependent upon the number of slots in the Geneva cam 105. This limited rotation will be imparted to the elongated pinion 112 and the pinion 113 on shaft 114 to cause the shaft 93 to rotate. Also secured to the shaft 114 is a scotch yoke 115 which is arranged to cause the rack 116 to have a reciprocating motion to drive the pinion 117 and the shaft 118 through a predetermined rotation. A cam 119 mounted on the shaft 118 is provided with a detent arranged to have a configuration that will cause the shaft 118 to be positioned axially upon rotation of the cam 119. A pin 122 secured within the detent 121 will produce this axial displacement. It can be seen that when the reversing cycle is started, the clutch 123 may cause the reversing pinion 91 and the drive shaft 92 to be engaged with the shaft 118 which in the meantime has been brought up to synchronous speed with the driving pinion by means of the rack 116 and pinion 117. Thereupon the rack and pinion 116 and 117 cause the drive shaft 92 to slow down, stop, reverse direction of rotation, and assume a speed synchronous with the remaining drive pinion which is rotating in the opposite direction. As the shaft 93 continues to rotate, the opposite drive pinion is engaged to the load. At this point the cam 119 disengages clutch 123 until the next reversing cycle is commenced.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In a reversing mechanism, an input shaft, a driven shaft having a pair of contra-rotating gears thereon driven by said input shaft, a third gear on said driven shaft, a gear rack meshing with said third gear, each of said gears having a keyway, said driven shaft having a key and being axially positionable to selectively engage one of said pair of gears, a scotch yoke secured to one end of said gear rack to provide same with reciprocating motion, means for initiating said reciprocating motion to provide said third gear with a rotational speed equal to that of the engaged gear, and means for causing said positionable key to be moved from engagement with said engaged gear to engagement with said third gear.

2. A reversing mechanism comprising an input shaft, a pair of members mounted to be contra-rotatable in accordance with rotation of said input shaft, an output shaft having a rotatable reversing member mounted thereon and normally disengaged therefrom, engaging means for selectively securing at least one of said members to said output shaft, means active at the initiation of the reversing cycle for causing said reversing member to be rotated firstly in one direction to a speed synchronous with one of said contra-rotating pair, to decelerate and reverse in direction, and then be rotated in an opposite direction to a speed synchronous with the other of said contra-rotating pair, and means for shifting said engaging means from securing one of said pair of members to said reversing member at said first-mentioned point of synchronous speed, then shifting said engaging means from said reversing member to said other of said pair of members at said second-mentioned point of synchronous speed.

3. A reversing mechanism comprising an input shaft, a pair of members, one mounted for rotation with said input shaft and one mounted for rotation on a second shaft having its axis parallel to said input shaft, said members lying in a common plane and connected for rotation in opposite directions, a pair of drive members each mounted on a shaft coaxial with one of said mentioned shafts, a coupling device selectively connecting each of said coaxial shafts together, a driven shaft having a reversing wheel thereon lying in a plane common to said drive members, said driven shaft lying on an axis parallel to said above-mentioned axes, one or the other of said pair of drive members being adapted to selectively drivably engage said reversing wheel, means selectively coupling one of said pair of drive members with said reversing wheel and simultaneously uncoupling the other of said drive members from said input shaft, a reciprocating member, a third coupling selectively securing said driven shaft to said reciprocating member, means causing said reciprocating member to attain a speed in the direction of the engaged one of said drive members, and cam means for engaging said last-mentioned coupling when synchronous speed between said driven shaft and said one drive member is achieved.

4. In a reversing mechanism, a unidirectional input member, an output member, coupling means for coupling said output member with said input member to be driven thereby and for uncoupling said two members, means connected with said input member for driving said output member in the same direction and at the same speed as said input member when said input and output members are uncoupled, and means driven in timed relation to said last-mentioned means for effecting a coupling operation of said coupling means while said members are driven in synchronism.

5. In a reversing mechanism, a pair of oppositely rotating input members and an output member, coupling means for coupling said output member with one or the other of said input members to be driven thereby and for uncoupling the same, means connected with said input members for driving said output member in synchronism with one or the other of said input members when one or the other of said input members and said output member are uncoupled, and means driven in timed relation to said last-mentioned means for effecting a coupling operation of said coupling means while the one or the other of said input members and said output member are driven in synchronism.

6. In a reversing mechanism, an input member and an output member, a pair of driving members connected with said input member for rotation in opposite directions, coupling means for coupling said output member with one or the other of said driving members and for uncoupling the same, means connected with said input member for alternately driving said output member first in the same direction and at the same speed as one of said driving members then in the same direction and at the same speed as the other of said driving members, and means driven in timed relation to said last-mentioned means for effecting a coupling operation of said coupling means while one or the other of said driving members and said output member are driven in synchronism.

7. In combination, a device for initiating a reversing cycle, an input shaft and an output shaft, a pair of contra-rotating members connected for rotation by said input shaft, a third reversibly-rotatable member connected with said input shaft for rotating the same first in synchronism with one of said members and then in synchronism with the other of said members, coupling means for selectively coupling one or the other of said members to said output shaft, and means controlled by said initiating device for transferring said coupling means first from said reversibly-rotatable member to the one of said pair of members when the same are rotating in synchronism and then from said reversibly-rotatable member to the other of said pair of members when the same are rotating in synchronism.

8. In a reversing mechanism, an input shaft, a pair of contra-rotating drive members connected for rotation by said input shaft, a rotatable member mounted on an output shaft and drivably engageable therewith, means for selectively engaging one of said drive members with said output shaft, means operative at the initiation of the reversing cycle for rotating said rotatable member synchronously with said engaged drive member and before completion of said reversing cycle for rotating said rotatable member synchronously with the other of said drive members, means operative during the reversing cycle for disengaging said engaged drive member from said output shaft, engaging said rotatable member with said output shaft, and disengaging said rotatable member from said output shaft and engaging the other of said driving members with said output shaft during the periods of synchronous rotation of said members.

9. A reversing mechanism comprising in combination, an input shaft, an output shaft, a pair of drive members rotatably mounted on the output shaft, means actuated by the input shaft to rotate the drive members in opposite directions, a third drive member rotatably mounted on the output shaft, means operable to rotate the third drive member in the same direction and to a speed synchronous with one of the pair of drive members and then rotate it in the opposite direction and to a speed synchronous with the other of the pair of drive members, means operable to engage any of the drive members with the output shaft, said last recited means being normally effective to engage one of the pair of drive members with the shaft, and means operable to shift the engaging means from engagement with one of the pair of drive members to engagement with the third drive member during the period of their synchronous rotation and to shift the engaging means from engagement with the third drive member to engagement with the other of the pair of drive members during the period of their synchronous rotation.

10. A reversing mechanism comprising, in combination, an input shaft, an output shaft, a pair of drive members rotatably mounted on the output shaft, means actuated by the input shaft to rotate the drive members in opposite directions, a third drive member rotatably mounted on the output shaft, means operable intermittently to rotate the third drive member in the same direction and to a speed synchronous with one of the pair of drive members and then rotate it in the opposite direction and to a speed synchronous with the other of the pair of drive members, means operable to engage any of the drive members with the output shaft, said last recited means being normally effective to engage one of the pair of drive members with the shaft, and means operable to shift the engaging means from engagement with said one of the pair of drive members to engagement with the third drive member during the period of their synchronous rotation and to shift the engaging means from engagement with the third drive member to engagement with the other of the pair of drive members during the period of their synchronous rotation.

11. A reversing mechanism comprising, in combination, an input shaft, an output shaft, a pair of gears rotatably mounted on the output shaft, means actuated by the input shaft to rotate the gears in opposite directions, a third gear rotatably mounted on the output shaft, means operable intermittently to rotate the third gear in the same direction and to a speed synchronous with one of the pair of gears and then rotate it in the opposite direction and to a speed synchronous with the other of the pair of gears, means operable to engage any of the gears with the output shaft, said last recited means being normally effective to engage one of the pair of gears with the shaft, and means operable to shift the engaging means from engagement with said one of the pair of gears to engagement with the third gear during the period of their synchronous rotation and to shift the engaging means from engagement with the third gear to engagement with the other of the pair of gears during the period of their synchronous rotation.

EDWARD DAWSON.

REFERENCES CITED

The following references are of record in the file of this patent:

UNITED STATES PATENTS

| Number | Name | Date |
| --- | --- | --- |
| 352,862 | Duncan | Nov. 16, 1886 |
| 1,873,531 | Bixby | Aug. 23, 1932 |
| 2,123,298 | Bollinger | July 12, 1938 |
| 2,258,475 | Sinclair | Oct. 7, 1941 |
| 2,408,067 | Herzig | Sept. 24, 1946 |
| 2,536,897 | Wood | Jan. 2, 1951 |